Nov. 28, 1967  J. J. QUACKENBUSH ET AL  3,354,865

CLOUD DISPERSION OF FINE PLASTIC POWDER

Filed April 12, 1966

INVENTOR.
JOHN J. QUACKENBUSH
HERBERT O. CORBETT
BY
Allen L. Meyer Jr.

3,354,865
CLOUD DISPERSION OF FINE PLASTIC POWDER
John J. Quackenbush, Monroe, and Herbert O. Corbett, Bridgeport, Conn., assignors to National Distillers and Chemical Corporation, New York, N.Y., a corporation of Virginia
Filed Apr. 12, 1966, Ser. No. 542,040
2 Claims. (Cl. 118—309)

This invention relates to an apparatus for the handling and deposition of fine micro size plastic powder, and more specifically relates to a novel apparatus for the even deposition of finely ground thermoplastic micro size powders of varying densities and varying particle sizes on a web.

The powder coating of webs of plastic material or paper, or the like, is well known to the art. In such arrangements, a stationary or moving base web is to have deposited or "dusted" thereon a suitable powder with the web and powder later being operated upon to cause the fine thermoplastic particles to melt and fuse to the web. Thus the coated web can be passed through an oven and subjected to temperatures which will cause the thermoplastic particles to melt and fuse to form an intimate bond and a continuous or non-continuous type coated surface as desired.

The materials can be further press nipped under pressure as by heated or chilled rolls to force the particles down into the web and provide, if desired, high gloss surfaces or intimate bonding of fibers of fabric-like materials.

Considerable difficulty has been experienced in the past to properly suspend and evenly deposit very finely ground thermoplastic powders of varying densities in the range of .910 to .965 and varying particle sizes of from 2 to 100 microns.

The principle of the present invention is to provide a novel apparatus for uniformly applying fine thermoplastic powders in the dry form to a stationary or moving web for the purpose of providing heat sealable, water resistant, high gloss or fiber bonding type coatings to the web surface.

The most common method for handling fine particle size dust or powder has been with the use of a fluidized bed. While this method is acceptable for controlling the dispersion of relatively large particle size powders, a number of difficulties are encountered when attempting to use a fluidized bed arrangement with extremely small diameter particles which are in the range of from 2 to 100 microns. Thus, when such small particles are used there will be erratic feed, unbalanced dispersion levels, and lack of control of the deposition.

The present invention provides a novel system wherein a cloud of fine particles can be supplied to and suspended in controlled average densities in a novel equilibrium cloud chamber. Suitable exit supply lines communicate from the equilibrium cloud chamber to a settling chamber which receives the web with the flow of micron size particles through the system including an average distribution of particles moving to a settling chamber.

It is, therefore, a primary object of this invention to provide a flow of micro size particles to a web where the flow includes an average mixture of particle density and size.

Yet another object of this invention is to provide a novel cloud dispersion arrangement for the deposition of plastic powders having a particle size range of from 2 to 100 microns and a density range of from .910 to .965.

A further object of this invention is to provide a novel apparatus for controlling the dispersion of extremely small powder particles of thermoplastic material.

Yet another object of this invention is to provide a novel dusting apparatus for dusting micro powders on a web which has a highly controlled feed and unbalanced dispersion level.

These and other objects of this invention will become apparent from the following description taken in connection with the drawing which schematically illustrates the apparatus used with the novel invention.

Referring now to the drawing, there is illustrated a supply hopper 10 which contains fine powders which are to be coated on a moving web 11 which can be a web of thermoplastic material or any other suitable web serving as a substrate for the powders to be deposited. The supply hopper is filled with suitable plastic particles such as ground particles of polyethylene, known as Microthene, a registered trademark of the National Distillers and Chemical Corporation, or any other suitable dusting powder having a particle size range of from 2 to 100 microns with densities in the range of from .910 to .965.

The supply hopper 10 is then connected to a suitable auger feed screw 12 which rotates as illustrated, to convey the powder from hopper 10 into a sealed supply canister 13. The supply canister 13 is provided with a sealed upper cap 14 which carries a vacuum motor 15 therein which operates to evacuate the interior of the supply canister 13 through valve 16 and out of a discharge outlet 17. The upper cap 14 further receives a conduit 18 which has an extending baffle 19 which is connected to a suitable air intake motor 20 which passes air through a silica-gel moisture trap 21 to insure the application of filtered intake air to the supply canister 13.

Head 14 is further provided with outlet lines 30 and 31 which are connected to input conduits 32 and 33 respectively of the equilibrium cloud chamber 34. Note that the input line 31 and its conduit 32 terminate at the left-hand end of the cloud chamber 34 which conduit 33 empties into the cloud chamber 34 at the right-hand end thereof at discharge conduit 35.

The equilibrium cloud chamber 34 then has a plurality of outlet lines 36, 37, 38 and 39 which each contain control valves 40 through 43 respectively and pressure gauges 44 through 47 respectively. The outlet lines 36 through 39 are then connected to a settling chamber 48 which has an inlet opening 49, and an outlet opening 50 for receiving the web 11. Preferably, openings 49 and 50 are sufficiently small to permit the close control of the pressure within settling chamber 48 with a pressure release labrynth 51 connected to opening 50 for the discharge of air pressure so that a constant pressure can be maintained within settling chamber 48.

In operation and to deposit a predetermined amount of powder on the web 11, vacuum unit 15 is turned on and filtered intake air is forced through conduit 18 into the supply chamber 13. The pressure in chamber 13 can range from approximately 1 to 17 inches of water. This over pressure then forces the fine powder coming from supply hopper 10 out through lines 30 and 31 and into the equilibrium cloud chamber 34 which is held at a pressure of approximately 0.1 to 7.0 inches of water. The cloud density of powders maintained within chamber 34 is controlled by the air intake rate into supply canister 13 where a lower intake air velocity to canister 13 will provide a lower cloud density within cloud chamber 34 and vice versa.

It has been found that this type arrangement will cause the powder particles to be held suspended in the cloud chamber even though they have a mixed particle size and a mixed density without the selective settling of various particle sizes and various particle densities from the remainder of the suspended powders.

The powders are then removed from cloud chamber 34 through the conduits 36 through 39 by the appropriate opening of their control valves 40 through 43. These valves are more particularly adjusted until their various pressure gauges 44 through 47 register the same pressure whereby the movement of air and the powders contained therein are found to move through the conduits with balanced dispersions or equal distribution of various particle sizes and various particle densities. The settling chamber under these conditions is preferably held at a pressure of about 0.1 to 7.0 inches of water, thereby to maintain a completely balanced pressurized system. The particles passing through conduits 36 through 39 then deposit on the web 50 as the web passes through settling chamber 48 where the web and the particles thereon are subsequently processed in any desired manner.

The flow rates through the various lines 30, 31 and 36 through 39 can, of course, be affected by the drag coefficient of these lines. Therefore, it is preferable that the interior of these tubes or supply lines offer as little resistance as possible to the flow of micron particles which pass therethrough.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. Apparatus for the dusting of a flat elongated web with an even distribution of powdered particles of varying particle size and varying density; said apparatus comprising a source of said powdered particles; a supply canister comprising a sealed chamber connected to said source; a blower pump means connected to said supply canister for pressurizing the interior thereof; a controlled source of dry air connected to said supply canister for controllably supplying dry air to the pressurized interior of said supply canister; an equilibrium cloud chamber comprising a hermetically sealed elongated chamber; a first and second outlet channel extending from said supply canister and connected to the interior of said cloud chamber at first and second spaced portions thereof; a settling chamber having an input port and output port for passing a web through the interior of said settling chamber and a pressure relief port; said cloud chamber having a plurality of spaced conduits extending from spaced interior portions thereof and extending into respectively spaced interior portions of said settling chamber at the top of said settling chamber and above the web received within said settling chamber.

2. The apparatus as set forth in claim 1 wherein said plurality of spaced conduits extending into said settling chamber have respective pressure gauge means therein.

References Cited

UNITED STATES PATENTS

| | | | |
|---|---|---|---|
| 2,758,564 | 8/1956 | Randall | 118—309 |
| 2,850,214 | 9/1958 | Rooney | 222—193 |
| 3,205,856 | 9/1965 | Sorensen | 118—309 X |

CHARLES A. WILLMUTH, *Primary Examiner.*

J. P. McINTOSH, *Assistant Examiner.*